(12) United States Patent
Arroyo et al.

(10) Patent No.: US 10,140,667 B2
(45) Date of Patent: Nov. 27, 2018

(54) SOCIAL CUSTOMER RELATIONSHIP MANAGEMENT OPPORTUNITY TEMPLATING

(71) Applicant: International Business Machines Corporation, Armonk, NY (US)

(72) Inventors: Jorge A. Arroyo, Carmel, IN (US); Stephen P. Kruger, Dublin (IE); Patrick J. O'Sullivan, Dublin (IE); Luciano M. P. da Silva, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 14/279,452

(22) Filed: May 16, 2014

(65) Prior Publication Data

US 2015/0332287 A1 Nov. 19, 2015

(51) Int. Cl.
| | | |
|---|---|---|
| *G06Q 50/00* | (2012.01) | |
| *G06Q 30/02* | (2012.01) | |
| *G06Q 10/06* | (2012.01) | |
| *G06F 17/24* | (2006.01) | |
| *G06F 17/30* | (2006.01) | |

(52) U.S. Cl.
CPC ............ *G06Q 50/00* (2013.01); *G06F 17/248* (2013.01); *G06F 17/30557* (2013.01); *G06F 17/30867* (2013.01); *G06Q 10/06* (2013.01); *G06Q 10/06316* (2013.01); *G06Q 30/0201* (2013.01); *G06Q 50/01* (2013.01); *G06Q 30/02* (2013.01)

(58) Field of Classification Search
CPC ..................................................... G06Q 50/00
See application file for complete search history.

(56) References Cited

U.S. PATENT DOCUMENTS

| | | | | |
|---|---|---|---|---|
| 2003/0229884 | A1* | 12/2003 | Carr ................. | G06F 17/30306 717/101 |
| 2005/0278297 | A1* | 12/2005 | Nelson ............. | G06F 17/30867 |
| 2006/0085449 | A1 | 4/2006 | Sattler et al. | |
| 2007/0094191 | A1* | 4/2007 | Wu ........................ | G06N 5/022 706/46 |
| 2007/0143165 | A1* | 6/2007 | Roberts ..................... | G06F 8/71 705/1.1 |
| 2007/0282673 | A1* | 12/2007 | Nagpal ................. | G06Q 10/06 705/7.13 |

(Continued)

OTHER PUBLICATIONS

Bryant et al., "Customer Relationship Management System and Method", U.S. Appl. No. 14/013,371, filed Aug. 29, 2013.

*Primary Examiner* — Kurtis Gills
(74) *Attorney, Agent, or Firm* — Peter J. Edwards

(57) ABSTRACT

The method includes receiving a target customer relationship management (CRM) opportunity from a social customer relationship management application. The method also includes extracting one or more structural elements from the target CRM opportunity. The method also includes extracting one or more structural attributes of each structural element responsive to extracting the one or more structural elements. The method also includes storing the one or more structural elements and the one or more structural attributes associated with each structural element in a template database. The method also includes creating a template from the one or more structural elements and the structural attributes in the template database.

15 Claims, 5 Drawing Sheets

(56) References Cited

U.S. PATENT DOCUMENTS

| | | |
|---|---|---|
| 2009/0089654 A1* | 4/2009 | Wittig .................. G06Q 10/107 |
| | | 715/223 |
| 2011/0173529 A1 | 7/2011 | Wagner |
| 2011/0238707 A1* | 9/2011 | Wong .................... G06F 17/248 |
| | | 707/802 |
| 2011/0296298 A1* | 12/2011 | Ahuja ............... G06F 17/30893 |
| | | 715/248 |
| 2012/0072436 A1* | 3/2012 | Pierre .................... G06Q 30/00 |
| | | 707/758 |
| 2012/0130809 A1 | 5/2012 | Tedjamulia et al. |
| 2013/0036138 A1 | 2/2013 | Bellows et al. |

\* cited by examiner

SOCIAL CUSTOMER RELATIONSHIP MANAGEMENT OPPORTUNITY TEMPLATING

BACKGROUND

The present disclosure relates to computer-based applications, and more specifically, to Customer Relationship Management applications.

Customer Relationship Management (CRM) may include, for example, sales, marketing, and service/support based functions to move a customer through a sales pipeline with an example goal of keeping the customer coming back to buy more and more products. CRM may be generally based around data and information that company brands may collect on their customers, all of which may go into a CRM system that may then allow the company to better target various customers.

Social CRM may generally be described as a strategy that may be supported by various tools and technologies. The strategy may be broadly based around customer engagement and interactions, with transactions being a byproduct. Social CRM may represent an evolved form of CRM, in which a back-end process and system for managing customer relationships and data may be provided in an efficient and process-centric way. Social CRM may be one component of developing a social or collaborative business, both internally and externally.

SUMMARY

Embodiments of the present disclosure include a method, a system, and a computer program product for creating a template for a target Customer Relationship Management (CRM) opportunity and retrieving the template.

One embodiment is directed toward a method for creating the template. The method includes receiving a target customer relationship management (CRM) opportunity from a social customer relationship management application. The method also includes extracting one or more structural elements from the target CRM opportunity. The method also includes extracting one or more structural attributes of each structural element responsive to extracting the one or more structural elements. The method also includes storing the one or more structural elements and the one or more structural attributes associated with each structural element in a template database. The method also includes creating a template from the one or more structural elements and the structural attributes in the template database.

Another embodiment is directed toward a system for creating a template for a target CRM opportunity and retrieving the template. The system includes a template database, an extraction engine, and a mapping engine. The extraction engine may be configured to receive a target customer relationship management (CRM) opportunity from a social customer relationship management application. The extraction engine may be configured to extract one or more structural elements from the target CRM opportunity. The extraction engine may be configured to extract one or more structural attributes of each structural element responsive to extracting the one or more structural elements. The extraction engine may be configured to store the one or more structural elements and the one or more structural attributes associated with each structural element in the template database. The mapping engine may be configured to create a template from the one or more structural elements and the structural attributes in the template database.

Another embodiment is directed toward a computer program product for creating a template for a target CRM opportunity and retrieving the template. The computer program product comprises a computer readable storage device having a computer readable program stored therein. The computer readable program, when executed on a computing device, causes the computing device to receive a target customer relationship management (CRM) opportunity from a social customer relationship management application. The computer program product causes the computing device to extract one or more structural elements from the target CRM opportunity. The computer program product causes the computing device to extract one or more structural attributes of each structural element responsive to extracting the one or more structural elements. The computer program product causes the computing device to store the one or more structural elements and the one or more structural attributes associated with each structural element in a template database. The computer program product causes the computing device to create a template from the one or more structural elements and the structural attributes in the template database.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
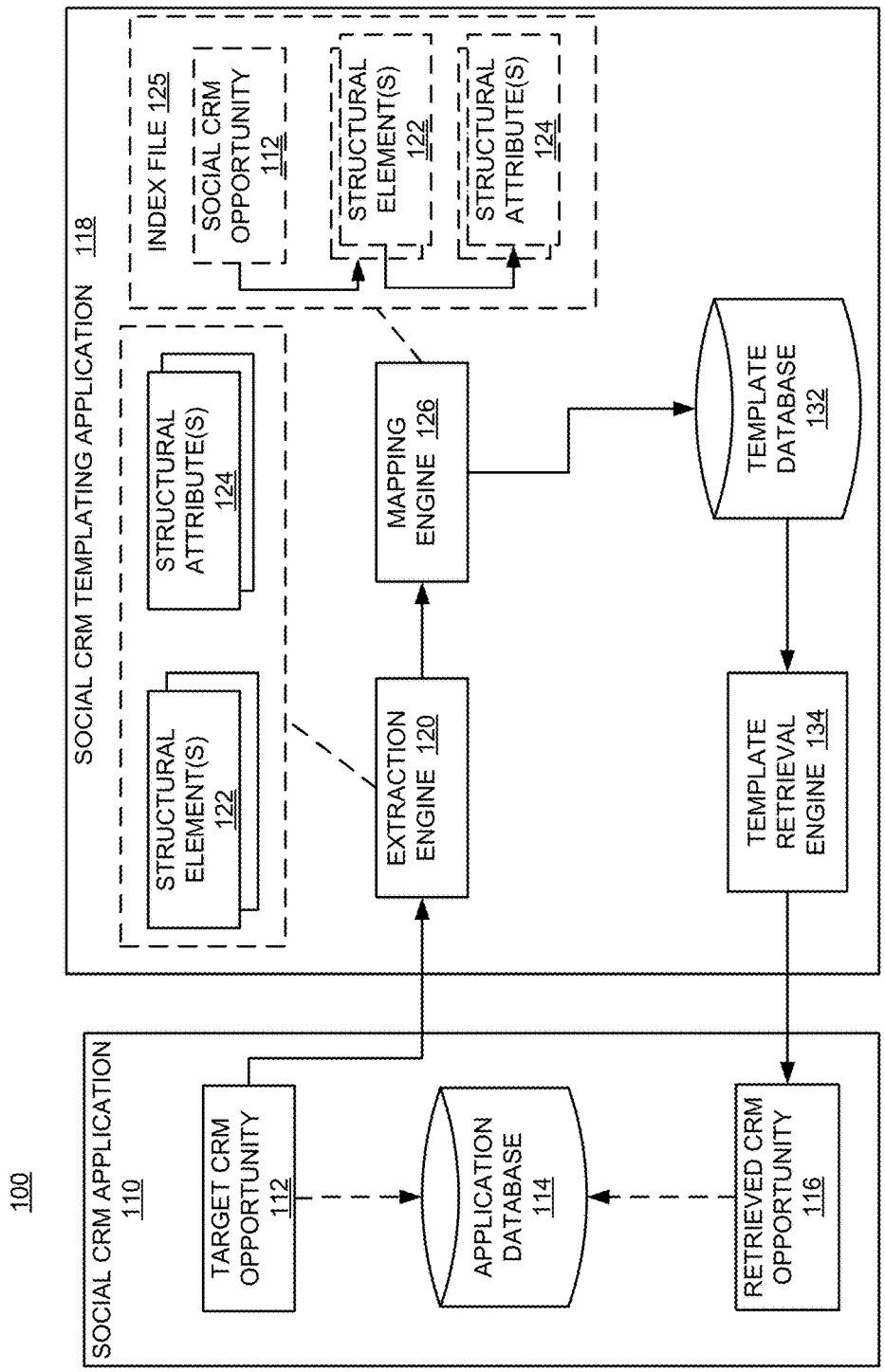
FIG. 1 illustrates a block diagram of a system for creating and retrieving a template of a social customer relationship management (CRM) opportunity, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer-based applications, more particular aspects relate Customer Relationship Management (CRM) applications. For instance, aspects of the present disclosure can relate to creating a template from a target CRM opportunity and using the template to create another CRM opportunity. The creation of the template can include extracting one or more structural elements from the target CRM opportunity and then extracting one or more structural attributes for each structural element in the target CRM opportunity. The various structural attributes and structural elements can be mapped together using a template index. The retrieval of the template can include accessing stored structural elements and structural attributes for the structural elements along with the template index. While the present disclosure is not necessarily limited to such applications, various aspects of the disclosure may be appreciated through a discussion of various examples using this context.

There are some differences between CRM and Social CRM. For example, CRM may often include one-way communication between a business and the customer. Social CRM may be an evolution of the CRM paradigm, and may represent the use of social media services, techniques, and technology to enable organizations to engage with their customers. Social CRM may have example applications in, e.g., marketing, customer service, and sales, including peer-to-peer customer support, idea management, market research, product launch, and brand reputation management.

As an emerging discipline, interpretations of Social CRM may vary. One explanation includes how Social CRM is a philosophy and a business strategy, supported by a technology platform, business rules, workflow, processes, and social characteristics. In this explanation, Social CRM is designed to engage the customer in a collaborative conversation in order to provide mutually beneficial value in a trusted and transparent business environment. It is the company's response to the customer's ownership of the conversation.

Users, such as sales individuals, may benefit from up to date, real-time status on their (e.g., sales) opportunities to help immediately react to any changes and influence the "sale" in their favor. Additionally, for example in a team environment, dynamic teams based around the sales opportunity may help to be formed so that interested parties may easily share information about the opportunity, with the end goal to move the opportunity to the point where the sale may be made. The ability to close on the sale opportunity may become easier when conveying and updating information to the team, such as the membership of these teams, the stages of the sales opportunity, and the roles of the members.

CRM opportunities help a sales team by organizing all the relevant data regarding a prospective deal into one place. A CRM opportunity can be characterized by data including prospective customers, expected budget, total spending, products interested in, expected closing date, key players in the deal and their key characteristics, important dates and milestones etc.

A CRM opportunity typically has several phases, e.g. initiation, identification, qualification, RFP received, quotation sent, final stage, won or lost. Of course these phases can be defined based on individual company needs. A CRM application helps in each phase by alerting a sales representative from the sales team to carry out certain suggested activities as defined by a company's sales policy. A CRM application can create reminders and planned activities within the system. For example, if the opportunity has reached a "Request For Proposal Received" stage and the deal size is more than 50,000 USD, then the CRM application can prompt the representative to hold a review discussion with a senior manager. This is often referred as "Guided Sales Methodology".

An opportunity, or Social CRM opportunity, refers to a sales account or contact which has been qualified, meaning that the sales account or contact may have been contacted and the contact wants to engage in further services. A Social CRM application can have thousands of opportunities. For instance, business applications that Opportunity A can use may be different than the business applications that Opportunity B can use in fulfilling sales goals. The opportunity goals can be different, as an opportunity owner decides what business applications are relevant and best for his/her opportunity. Likewise, associated with alternate business opportunities can be different business processes that can be used to assist in life cycle management of that opportunity. An example of a life cycle event can be a deal size exceeding 50,000 USD and the system prompting the representative to hold a review discussion with a senior manager. A small scale, short-lived opportunity may have less business logic, or fewer processes when compared with a large scale, long-lived opportunity.

As mentioned herein, the opportunity can include the various programs and views used within the social CRM application. When starting a similar opportunity in the social CRM application, a user of the social CRM application may need to start from the beginning and waste valuable time. Thus, the social CRM application can be configured to use a template and retrieve saved templates of social CRM opportunities to avoid recreating a social CRM opportunity.

Since one Social CRM opportunity can have a different set of applications used, business processes used, triggers, or initiation, aspects of the present disclosure allow a social CRM templating application to receive a target social CRM opportunity selected from a social CRM application and create the template by which another opportunity is created. This resulting template can form the structure for other CRM opportunities.

FIG. 1 illustrates a block diagram of a system 100 for creating and retrieving a template of a social customer relationship management (CRM) opportunity, according to various embodiments. The system 100 can include a social CRM application 110 and a social CRM templating application 118. Even though reference is made to the term social CRM application, the social CRM application may also include a CRM application. The social CRM application 110 can be configured to interact with various opportunities including a target CRM opportunity 112. The target CRM opportunity 112 may access one or more application databases 114 to store and retrieve data regarding the target CRM opportunity 112. The term target CRM opportunity 112 can refer to a social CRM opportunity.

In various embodiments, an opportunity owner from the social CRM application 110 can request that a template be formed based on the target CRM opportunity 112. For example, the opportunity owner can request a template be formed via an option menu on the target CRM opportunity 112. The social CRM application 110 can call on the social CRM templating application 118 to create a template based on the target CRM opportunity 112 or to retrieve a template to form a retrieved CRM opportunity 116 in the social CRM application 110.

Once called, the social CRM templating application 118 reads the target CRM opportunity 112. In various embodiments, the social CRM templating application 118 can extract the framework and the business logic of the target CRM opportunity 112. The social CRM templating application 118 can contain an extraction engine 120 that is configured to extract structural elements 122 from the target CRM opportunity 112. For example, a target CRM opportunity 112 can have a certain page layout that is extracted by the extraction engine 120.

The structural elements 122 can describe what is included in the target CRM opportunity 112. For example, the structural elements 122 can describe a database of the target CRM opportunity 112. In various embodiments, one or more structural attributes 124 may also be extracted by the extraction engine 120. The structural attributes 124 can describe the details of the target CRM opportunity 112. For example, the structural attributes 124 can describe the data model of the database and queries used. Both the structural elements 122 and the structural attributes 124 can be described further herein.

The extraction engine 120 can break down the target CRM opportunity 112 into increasing levels of granularity. The extraction engine 120 can perform one or more passes that extract data from the target CRM opportunity 112. Each pass can correspond to a particular level of granularity. For example, on a first pass, the extraction engine 120 can extract the structural elements 122. On a second pass, the extraction engine 120 can extract the structural attributes 124. On a third pass, the extraction engine 120 can extract security definitions relating to security permissions (e.g., a structural attribute 124) for an application (i.e., a structural element 122). According to various embodiments, extracting security definitions or content may occur after the extraction of other structural attributes 124 of a structural element 122 in order to enhance performance. For example, the extraction engine 120 cannot put security access controls against entities that do not exist, therefore the structural attributes 124 are determined before security permissions.

Extracting the structural elements 122 and structural attributes 124 in one operation may create performance issues because of the large amount of data associated with both the structural elements 122 and the structural attributes 124. For example, the structural elements 122 may have a file size 10 times smaller than the structural attributes 124 associated with the structural element 122.

In various embodiments, the extraction engine 120 can "spider" the target CRM opportunity and establish the structure of the arbitrary opportunity, in terms of the applications used and the broader application graph template retrieval engine in which the target CRM opportunity is realized. The extraction engine 120 can ascertain the business applications used, e.g., Communities, Activities, Wikis, or Team Rooms.

Once the extraction engine 120 extracts the structural elements 122 and the structural attributes 124 from the target CRM opportunity 112, then the mapping engine 126 can map the structural attributes 124 to the structural elements 122. The mapping engine 126 also maps the structural elements 122 to the social CRM opportunity 112. In various embodiments, the structural elements 122 and structural attributes 124 can be written in an Extensive Markup Language (XML) definition file. For example, the target CRM opportunity 112 can be captured into one or more XML files with each structural attribute having a separate XML file. Although reference is made throughout this disclosure regarding the use of an XML definition file, nothing in this disclosure should limit the various embodiments to only XML definition files as the only format. For example, aspects of the disclosure can also utilize JavaScript Object Notation (JSON), Comma-Separated Values (CSV), etc.

An XML definition file can be associated with each structural element 122. For example, the structural element 122 XML can have an entry that indicates the email application accessed, or the database used. For each entry, a corresponding XML definition file can be described, e.g., email application settings. The mapping engine 126 can link the various XML definition files from the target CRM opportunity 112 into a structure that can be readily accessed. For example, the mapping engine 126 can be configured to create a template index file 125 that maps together the various XML files. In various embodiments, the template index file, or index file 125, can map the social CRM opportunity 112 to the structural elements 122 and map each structural element to one or more structural attributes 124. Although only one index file 125 is depicted, the social CRM templating application 118 can have more than one index file 125 for a target CRM opportunity 112.

Once the mapping engine 126 maps the target CRM opportunity 112, then the mapping engine 126 can save the data associated with the target CRM opportunity 112, e.g., XML files and a template index file 125, into a template database 132. The template database 132 can store multiple templates associated with multiple social CRM opportunities. The template database 132 can be either relational or non-relational. In various embodiments, the social CRM templating application 118 can automatically template any CRM opportunity in the social CRM application 110 as it is encountered. For example, as a CRM opportunity is encountered, the social CRM application 110 can associate the CRM opportunity as a target CRM opportunity 112, then the social CRM application 110 can request the social CRM templating application 118 to template the target CRM opportunity 112.

A CRM opportunity, e.g., a target CRM opportunity 112, in a social CRM application 110 may include the applications, data, metadata and complex graph that intertwines the structural elements in the target CRM opportunity 112 across the superset application plane. Once the target CRM opportunity 112 is extracted into an object, the template can be shared, backed up, restored, deleted, interrogated, and audited.

In various embodiments, the extraction engine 120 can perform three passes. For example, the extraction engine 120 can perform an initial pass on the target CRM opportunity 112 and establish the superset applications used, a subsequent pass that identifies the inter-application content relevant to the target CRM opportunity 112, and a final pass that inter-relates the applications discovered to mine out relationships that point to this target CRM opportunity 112 (e.g. an email related to the target CRM opportunity 112 that links to an activity for the target CRM opportunity 112 defined an association that will be recorded in the structure of the target CRM opportunity 112).

In various embodiments, a state table that reflects the target CRM opportunity 112 footprint derived from the extraction engine 120 can be created to store the target CRM opportunity 112. The state table can be a blueprint/plan of the target CRM opportunity 112, and represents the template definition. Associated with this state table can be a meta-state table, which captures relational maps to business logic governed by this target CRM opportunity 112. In this way, the state table (template) and meta-state table (data) are independent entities that can be used for the purposes of both templating and backup/restore. In various embodiments, the state table and meta-state table represent two possible artifacts that can be used to extract an target CRM opportunity 112 for the purposes of movement, migration, backup, restore, delete, audit and interrogation.

Once the social CRM application 110 requests the template to be retrieved, then the social CRM templating application 118 can direct the template retrieval engine 134 to access the template database 132. The template retrieval engine 134 can access the template requested by the social CRM application 110. Once the template data is accessed, then the template retrieval engine 134 can assemble the template into a retrieved CRM opportunity 116 according to a retrieval method described herein. In various embodiments, the template of the retrieved CRM opportunity 116 can be sent to the social CRM application 110 to be assembled into a retrieved CRM opportunity 116. A retrieved CRM opportunity 116 based on the target CRM opportunity 112 can contain the same framework as the target CRM opportunity 112. The retrieved CRM opportunity 116 can access the same application database 114 as the target CRM opportunity 112.

Figure 2:
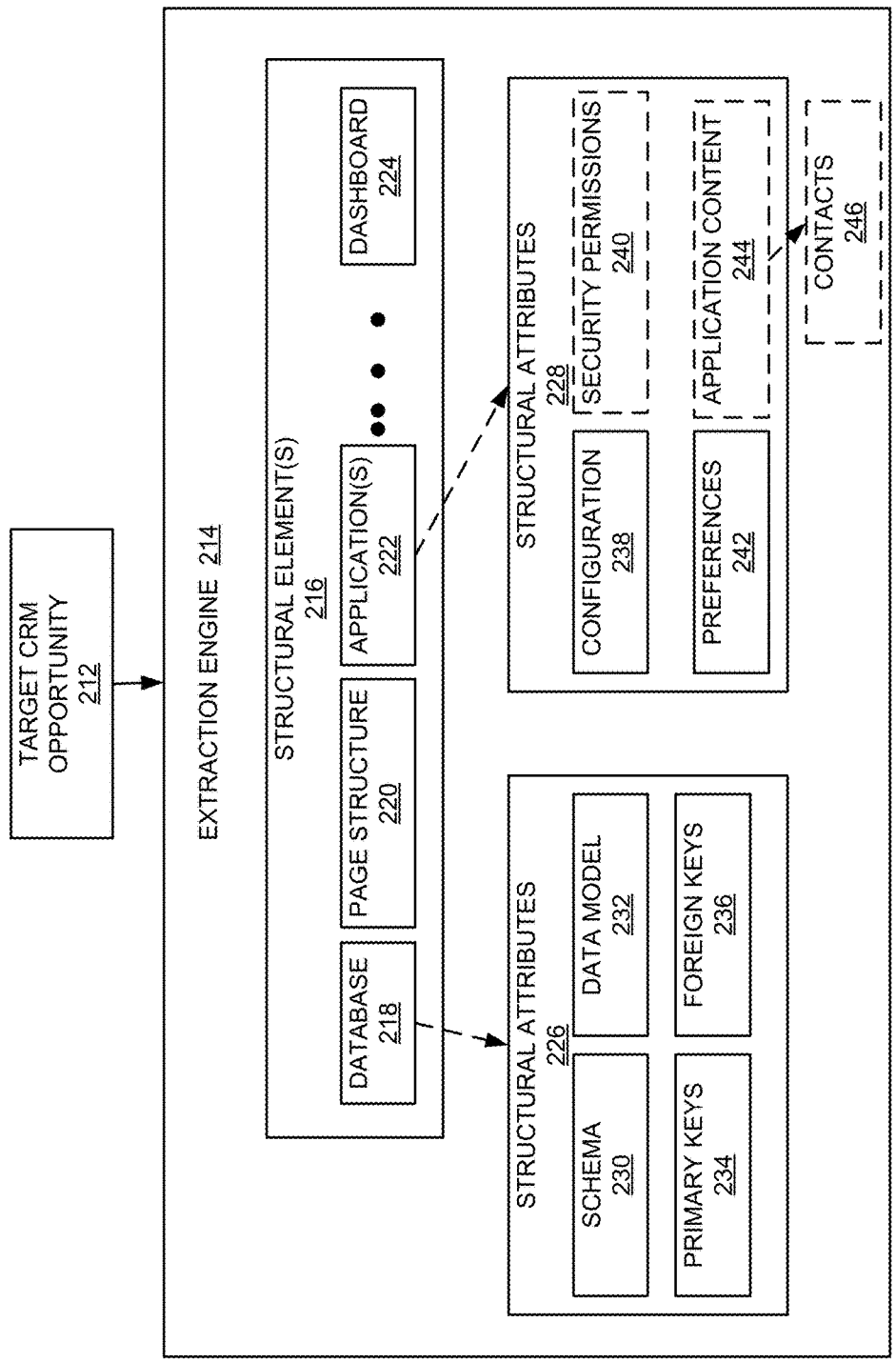
FIG. 2 illustrates a block diagram of an extraction engine that extracts structure data from the target CRM opportunity, according to various embodiments.

FIG. 2 illustrates a block diagram of an extraction engine 214 that extracts structure data from the target CRM opportunity 212, according to various embodiments. The extraction engine 214 can be similar to the extraction engine 120 described in FIG. 1. The extraction engine 214 is shown as an example and is not limited to the embodiment described herein. The extraction engine 214 can be configured to receive a target CRM opportunity 212. The target CRM opportunity 212 can be similar to the target CRM opportunity 112 in FIG. 1.

Once the target CRM opportunity 212 is received by the extraction engine 214, then the extraction engine 214 can extract the structure of the target CRM opportunity 212. The target CRM opportunity 212 can include a mixture of business logic and relational logic. Business logic can be the part of a program that encodes the real-world business rules that determine how data is created, displayed, stored and changed. The business logic can determine the workflow on how data is transformed, calculated, and routed to users. The relational logic can control how the data within a particular database is managed.

The extraction engine 214 can extract one or more structural elements 216 from the target CRM opportunity 212. Examples of structural elements 216 include a database(s) 218 used in the target CRM opportunity 212, the page structure 220, applications 222 used in the target CRM opportunity 212, and a dashboard 224.

The home page of the target CRM opportunity 212 may include a specific layout. The page structure 220 refers to the layout. For example, an application view may be in position 1 on the home page, while sales statistics may be in position 2 on the home page. The extraction engine 214 can capture the page structure 220 by analyzing the files associated with the page structure, e.g., HyperText Markup Language (HTML), and Javascript.

For each structural element 216, one or more structural attributes, e.g., 226 and 228, may be associated with the structural element 216. For example, the database 218 may have structural attributes 226. The structural attributes 226 can relate specifically to the database 218. The structural attributes 226 for the database 218 can include schema 230, data models 232, primary keys 234, and foreign keys 236. According to various embodiments, the target CRM opportunity 212 may have a plurality of relational stores involved (i.e., database 218), with each relational store associated with the various applications 222. For each of the relational stores associated with an application 222, a data model, schema, attributes and database definition can be extracted. The primary keys 234 and foreign keys 236 may be understood in the context of relational databases. For example, the foreign key 236 is a field in a table that identifies a row of another table. The primary key 234 can be a set of attributes that uniquely define the characteristics of each row.

Each application associated with the target CRM opportunity 212 can include various structural attributes that may be different between each application. The application 222 may include structural attributes 228 which may be different than structural attributes 226. The structural attributes 228 can include configuration settings 238, security permissions 240, application preferences 242, and application content 244. The application preferences 242 can refer to options that the user selected. For example, if the graph is displayed as a pie graph instead of a scatter plot by default. The configuration 238 can refer to how the application is connected to the business logic. The application content 244 and the security permissions 240 can be considered optional depending on the security permissions 240 of the application 222 and whether content will be extracted into the template. For example, some applications 222 may not have security restrictions. The application content 244 can be optionally selected by the target CRM opportunity owner.

The extraction engine 214 can extract the structure of the target CRM opportunity 212 in various passes. For example, in a first pass, the extraction engine 214 can extract the structural elements 216 for the target CRM opportunity 212. The extraction engine 214 can extract the structural elements 216 into an XML file or a Javascript Object Notation (JSON) file. For example, the XML file can indicate that the target CRM opportunity 212 uses "email application 1", database: "extra data", with a page structure of "hyper.html".

On a second pass, the extraction engine 214 can extract the structural attributes 228 for the application and extract the structural attributes 228 into a separate XML file. For example, the application "email application 1" can further have various configuration settings 238 and preferences 242 indicated.

On a third pass, the extraction engine 214 can further extract security permissions 240 for the "email application 1". The security permissions 240 may be determined after the structural attributes 228 are determined because a security permission 240 may depend on a structural attribute 228. For example, the security permissions 240 can specify which users have access to change the preferences 242 of the application. The security permissions 240 may involve one or more security definition files.

In subsequent passes, the extraction engine 214 can specify the content that the opportunity owner wants to extract from the target CRM opportunity. For example, on a fourth pass, the extraction engine 214 can prompt the opportunity owner of the target CRM opportunity 212 to specify which application content 244 should be included in the template. The application content 244 includes items beyond the structure of the target CRM opportunity 212. For example, the opportunity owner or user acting on behalf of the opportunity owner may select key contacts 246 vital to any sales decisions within a particular company. The contacts 246 may be extracted from the target CRM opportunity 212 to store in the template.

Figure 3:
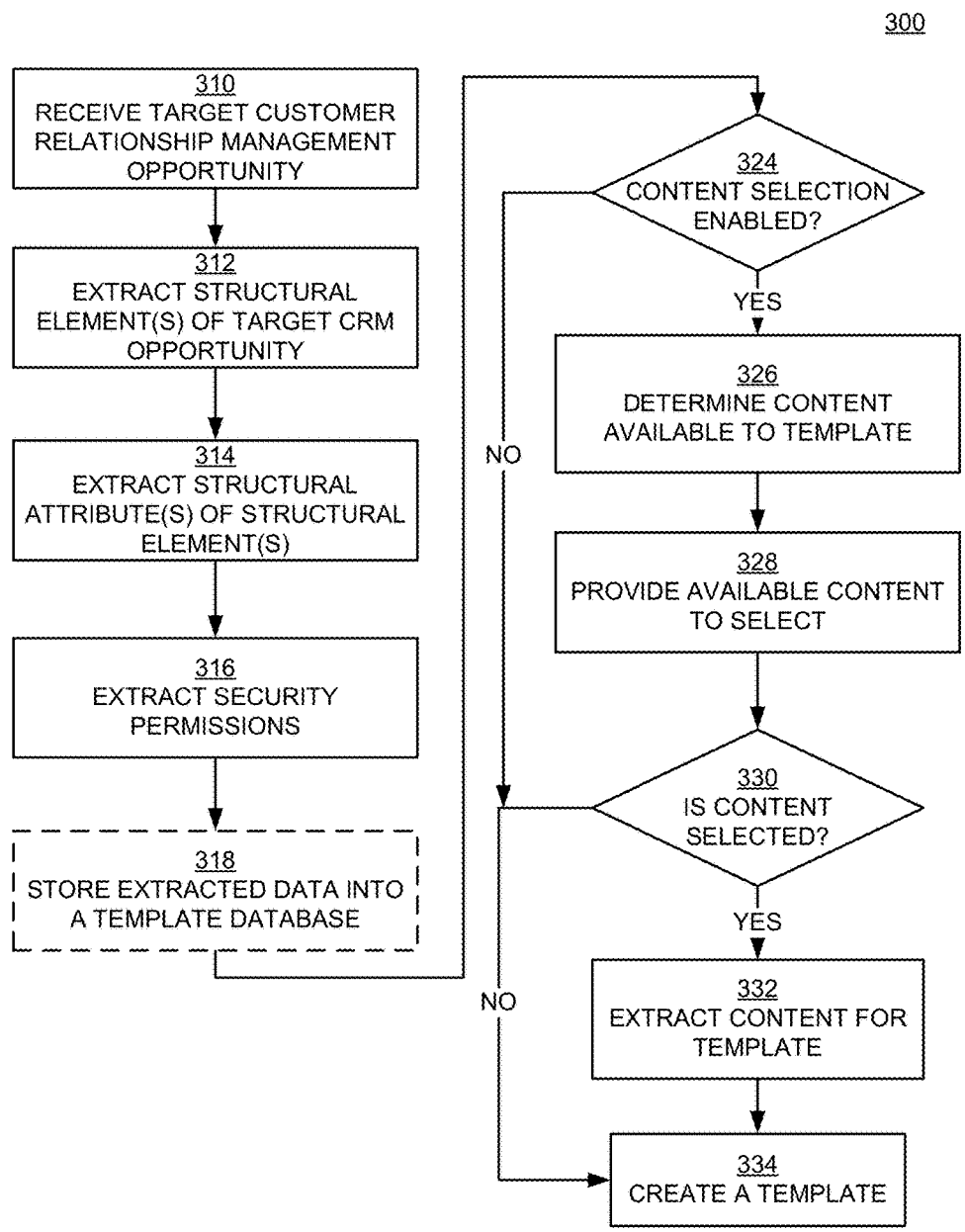
FIG. 3 illustrates a flowchart of a method for creating a template for a target CRM opportunity, according to various embodiments.

FIG. 3 illustrates a flowchart of a method 300 for creating a template for a target CRM opportunity, according to various embodiments. The method 300 can include receiving a target CRM opportunity selected by a social CRM application and extracting structural elements and structural attributes of the structural elements in various passes. For an application structural element, further passes can be made to extract security permissions of the application (i.e., structural attributes) and the content of the application (i.e., structural attributes). The method 300 begins at operation 310.

In operation 310, the social CRM templating application can receive the target CRM opportunity from the social CRM application. A user of the social CRM application or an opportunity owner may select the target CRM opportunity based on preferences. In various embodiments, all target CRM opportunities may be selected for templating by the social CRM application as a default setting. Once the target CRM opportunity is received, then the method 300 continues to operation 312.

In operation 312, the extraction engine of the social CRM templating application can extract one or more structural elements from the target CRM opportunity. Operation 312 can be a first pass extraction of the social CRM templating application. For example, the first pass may focus on obtaining the relational structure of the target CRM opportunity. In the first pass, the structural elements, e.g., the applications, databases, and the layouts that make up the target CRM opportunity, can be determined and stored, e.g., into an XML definition file. In various embodiments, the extraction can be referred to as interrogating or decomposing the target CRM opportunity. Once the structural elements of the target CRM opportunity are extracted, then the method 300 continues to operation 314.

In operation 314, the extraction engine of the social CRM templating application can extract the one or more structural attributes of each structural element responsive to extracting the one or more structural elements. For example, each structural element may have one or more structural attributes associated with the structural element. Operation 314 can be a second pass of the extraction of a social CRM templating application. For example, the second pass may focus on capturing more details of the target CRM opportunity. The structural attributes of applications may require further passes by the extraction engine to capture application structure. For example, security permissions and application content of applications may be captured on a third pass. The structural attributes may also be extracted into an artifact, e.g., an XML definition file. The XML definition file for the structural attribute may relate to a structural element in the XML definition file from operation 312. Once the structural attributes are extracted, then the method 300 continues to operation 316.

In operation 316, the extraction engine of the social CRM templating application can extract security permissions for the application (i.e., a structural element). A security permission may be related to a user or class of users. For example, in a task management application, only managers can approve tasks, or instigate a web conference. The security permissions for managers can be associated with the task management application in a template database. The security permissions can be related to a security access control system and concern who has access to what and when. The security permissions can be linked to an application server cluster (e.g., application server definitions), one or more relational repositories, a security subsystem such as a signal signup system, or a Lightweight Directory Access Protocol, that has names and address of people, or a web server. Once the security permissions are extracted, then the method 300 continues to operation 318.

In operation 318, the mapping engine of the social CRM templating application can store the one or more structural elements and the one or more structural attributes associated with each structural element in a template database. Storing the extracted data immediately after operation 316 may be optional. The storing of the one or more structural elements and the one or more structural attributes can occur after an extraction in method 300. For example, the storage of each of the structural elements and the corresponding structural attributes can occur immediately after the extraction. Once extracted, the XML file for the structural elements taken in the first pass can be stored in the template database. Once the structural attributes for a structural element is extracted in a second pass, then the XML file for the structural attribute can be stored in the template database. In various embodiments, the storage of the structural elements and corresponding structural attributes can occur as a separate operation prior to the creation of the template. After the extracted data is stored into the template database, then the method 300 continues to operation 324.

In operation 324, the extraction engine can determine whether content selection is enabled. Content selection allows the extraction engine to import content from various structural elements in the target CRM opportunity, e.g., an application. For example, content selection can allow the extraction engine to import the values or tuples from a database. Content selection can also allow the extraction engine to import the friends list from an instant messaging application. In various embodiments, the content selection may occur in a subsequent pass from operation 316. If the content selection is not enabled in the extraction engine, then the method 300 continues to operation 334 where a template is created without the content. If the content selection is enabled in the extraction engine, then the method 300 continues to operation 326.

In operation 326, the extraction engine can determine the content available to the template. The content available can be determined by examining the structural attributes for the structural element. For example, if the structural attributes of an email application includes a contacts field, then the extraction engine can present the contacts as an available option for the template. The extraction engine can also determine which contacts can be excluded for the template and not presented. For example, if a first user locks read-access for a decision maker contact for a target CRM opportunity because the first user does not want a second user to contact the decision maker, then the contact may be excluded in the template for the second user. Once the content available is determined, then the method 300 can continue to operation 328.

In operation 328, the extraction engine can provide a list of available content for a user to select. In various embodiments, the extraction engine can prompt the user for a list of various fields to import to the template. For example, a user may select amongst a listing of contacts, settings, or groups within an instant messaging application within a target CRM opportunity. Once the content is provided, then the method 300 continues to operation 330.

In operation 330, the extraction engine can determine whether the content is selected by a user of the social CRM application or an opportunity owner. The opportunity owner/user can select from the available content provided. For example, in an instant messaging application, the user can select 30 out of 70 possible friends to export to the template. If the content is selected, then the method 300 continues to operation 332. In operation 332, the extraction engine can extract the content for the template based on the selection. For example, the extracted content can be extracted into a separate XML definition file which can be linked to the structural element or the structural attribute. If no content is selected by the opportunity owner, then the method 300 continues to operation 334.

In operation 334, the social CRM templating application creates a template from the one or more structural elements and the structural attributes. The template may be created from the structural elements and structural attributes stored in the template database, including the security definitions and the content. In various embodiments, the social CRM templating application can use a mapping engine to create a template index that maps the one or more structural attributes to the one or more structural elements, and that maps the one or more structural elements to the target CRM opportunity.

For example, the mapping engine can read an XML file for the target CRM opportunity to identify the structural elements. The mapping engine can map an email application (i.e., a structural element) to the XML file containing the email application preferences (i.e., a structural attribute of the email application), and the XML file containing the email application configuration (i.e., another structural attribute of the email application). The mapping engine can also map the content of the email application and the security permissions of the email application.

In various embodiments, the map may be an index file of the relationships between the structural elements and the structural attributes. The index file may be stored in the template database. Once the mapping engine creates the template, then the XML files and index files associated with the template may be stored in the template database.

Figure 4:
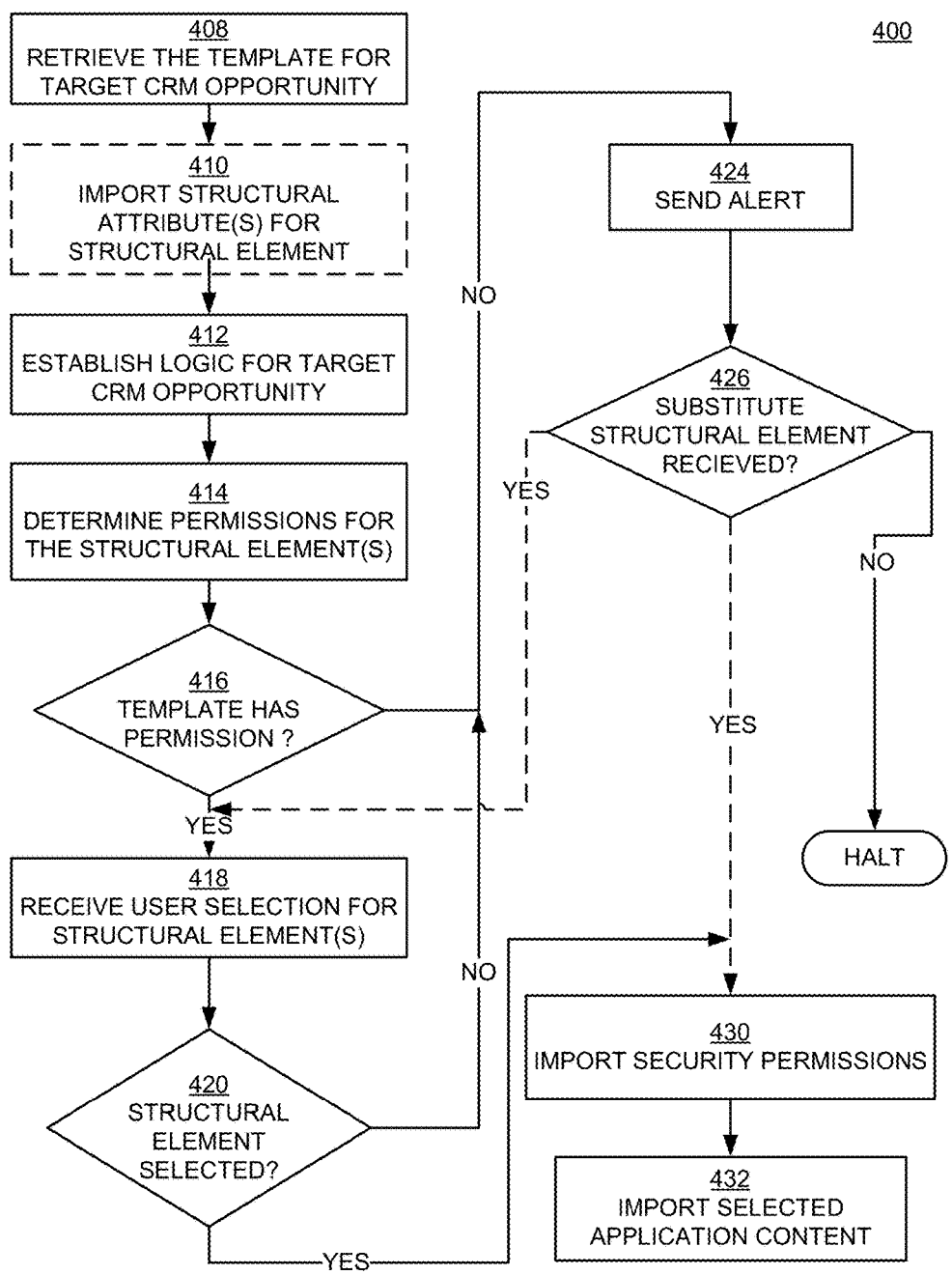
FIG. 4 illustrates a flowchart of a method for retrieving a template, according to various embodiments.

FIG. 4 illustrates a flowchart of a method 400 for retrieving a template, according to various embodiments. Aspects of method 400 may be performed by the template retrieval engine. The method 400 can involve retrieving the template, importing the structural elements and structural attributes for the target CRM opportunity, and importing security permissions and content for the structural element. In various embodiments, the method 400 can utilize the index and the XML definition files stored within the template database. The method 400 begins at operation 408.

In operation 408, the template retrieval engine retrieves the template files for the target CRM opportunity based on the request of the social CRM application. In various embodiments, the template retrieval engine can retrieve one or more index files that map the relationship between the various XML files for the structural elements and structural attributes for the target CRM opportunity. Once the template for the target CRM opportunity is retrieved, then the method 400 continues to operation 410.

In operation 410, the template retrieval engine imports the one or more structural attributes for each structural element. The template retrieval engine can import the structural attributes by associating the location of the structural attribute in the template database with the structural element in the template database. In various embodiments, operation 410 is optional and included when performing operation 408. Once the structural attributes are imported, then the method 400 may continue to operation 412.

In operation 412, the template retrieval engine can establish the logic for the target CRM opportunity. In various embodiments, establishing the logic can refer to establishing the business logic for a retrieved CRM opportunity from the one or more structural attributes, or establishing a relational logic for the retrieved CRM opportunity from the one or more structural attributes. Both the business logic and the relational logic can also be established by the template retrieval engine. The business logic and relational logic is mentioned herein and can refer to instructions related to an application and database, respectively. Once the logic is established using the structural attributes and structural elements of the target CRM opportunity, then the method 400 continues to operation 414.

In operation 414, the template retrieval engine can determine permissions for the structural element. In various embodiments, the template retrieval engine can detect a true/false condition of the presence of the permissions for a structural element. The structural element can refer to an application. The permissions can include the install or access permission for the application. For example, an application may not have enough licenses for all of the users that access the application. Therefore, an administrator may restrict the usage of the applications within the template for the target CRM opportunity to only a handful of users. The structural element can also refer to a database used by the template. For example, the database may be accessible to only a certain class of users such as managers.

The term permissions can refer to security permissions. For example, the security permissions can be for an instant messaging application used in a target CRM opportunity. The security permissions can refer to the various users allowed to access the instant messaging application. For each structural element, the template retrieval engine can determine whether the requesting user of a template has permission to access the structural element in operation 416. If the requesting user of the template does not have permission, then the method 400 continues to operation 424. If the requesting user of the template does have permission, then the method 400 continues to operation 418.

In operation 418, the template retrieval engine can present the requesting user with a selection of structural elements (e.g., applications) and the user can select the various structural elements to carry forward into a retrieved CRM opportunity. For example, the template may have access to an instant messaging application and a sales call database. A user of the social CRM application can specify that it only wants the instant messaging application selected and carried forward into the retrieved CRM opportunity. For every structural element, the template retrieval engine can determine whether the structural element is selected by the user. If a structural element is selected, then the method 400 continues to operation 430. If a structural element is not selected (i.e., any structural element), then the method 400 continues to operation 424.

In operation 424, the template retrieval engine can send an alert to the social customer relationship management application. In various embodiments, the template retrieval engine can send the alert based on the structural element being inaccessible. An inaccessible structural element can be each structural element that does not have permissions or is not selected. An inaccessible structural element may not be included in the retrieved CRM opportunity. The alert can be a pop-up or otherwise visual indication that there are no structural elements to import to the retrieved CRM opportunity. Once the alert is provided to the social CRM application, then the method 400 can continue to operation 426.

In operation 426, the template retrieval engine can receive a substitute structural element from the social CRM application. In various embodiments, a requesting user of the social CRM application can select a substitute structural element responsive to the alert. The substitute structural element can be a structural element that does not have permission restrictions. For example, a substitute structural element can be a license-free application that is equivalent to an application requiring a license. A substitute structural element can also be a public version of a database with certain fields removed. The substitute structural element can be provided to the social CRM application and received by the template retrieval engine. In various embodiments, the substitute structural element can be predetermined and associated with various structural elements prior to the alert being sent to the social CRM application. If the substitute structural element is not received by the template retrieval engine, then the method 400 may halt. According to various embodiments, the retrieved CRM opportunity may be retrieved without the structural elements that lack permission.

If the substitute structural element is received, then the method 400 continues to one or more possible paths depending on social CRM templating application preferences. In a first path, the social CRM templating application preferences can indicate that the substitute structural element is presented as an option to a social CRM application user in operation 418. The first path may occur if the substitute structural element is not immediately selected by a user in operation 426, e.g., when a substitute structural element is predetermined prior to the alert in operation 424. In a second path, the social CRM templating application preferences can indicate that the substitute structural element is accepted by the user and continue to operation 430.

In operation 430, the template retrieval engine can import the security permissions for the structural elements from the template database. According to various embodiments, the existence of security permissions may have been determined in operation 414. In operation 430, the template retrieval engine imports the security permissions if the security permissions exist or if the structural element is selected by the social CRM application. Once the security permissions are imported from the template database, then the method 400 continues to operation 432.

In operation 432, the template retrieval engine can import the content associated with the structural element. The content associated with the structural element may have been associated with the structural element during the creation of the template. For example, in an instant messaging application (i.e., the structural element), the friends list content may be associated with the instant messaging application in the template database while the template is being saved. Once the content is imported, then the template can be established by the template retrieval engine. For example, the template data collected in method 400 can be provided to the social CRM application by the social CRM templating application. The requesting user from the social CRM application can build the retrieved CRM opportunity from the template data.

Figure 5:
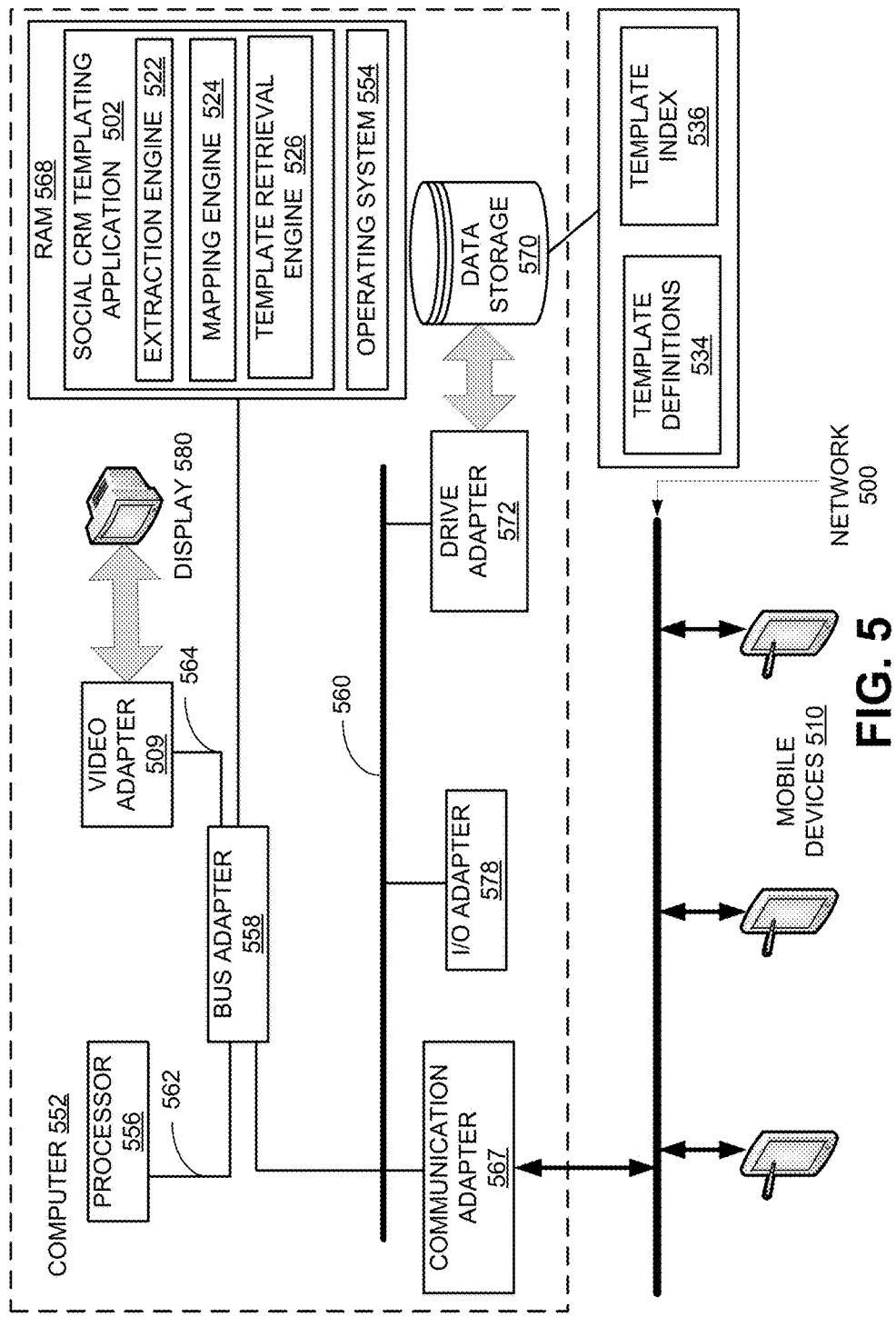
FIG. 5 illustrates a block diagram of automated computing machinery, according to various embodiments.

FIG. 5 illustrates a block diagram of automated computing machinery, according to various embodiments. The computing machinery may include example computer 552 useful in performing aspects of the disclosure, according to various embodiments. The computer 552 of FIG. 5 includes at least one computer processor 556 or 'CPU' as well as random access memory 568 ('RAM') which is connected through bus adapter 558 to processor 556 and to other components of the computer 552.

The RAM 568 may include a social CRM templating application 502. The social CRM templating application 502 can manage templates for a social CRM application. The social CRM templating application 502 can have an extraction engine 522, a mapping engine 524, and a template retrieval engine 526. The extraction engine 522 can extract one or more structural elements and one or more structural attributes for each structural element from a social CRM opportunity. The structural attributes and structural elements can be stored into the data storage 570 in the template definitions 534. The social CRM templating application 502 can also have a mapping engine 524. The mapping engine 524 can create a template index 536 that maps the template definitions 534. The template retrieval engine 526 can retrieve the template from the data storage 570. The template retrieval engine 526 can retrieve a template based off of the template definitions and the template index 536.

The RAM 568 may include an operating system 554. Operating systems useful for record filtering according to embodiments of the present invention include UNIX®, Linux®, Microsoft XP™, AIX®, IBM's i5/OS™, and others. The operating system 554 are shown in RAM (568), but many components of such software typically are stored in non-volatile memory also, such as, for example, on a disk drive 570.

The computer 552 may also include disk drive adapter 572 coupled through expansion bus 560 and bus adapter 558 to processor 556 and other components of the computer 552. Disk drive adapter 572 connects non-volatile data storage to the computer 552 in the form of disk drive 570. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 570 may include one or more storage devices in a tiered or non-tiered configuration. The data storage 570 can include one or more template definitions 534 and template indexes 536 that are extracted by the social CRM templating application 502 and stored for later use.

The example computer 552 includes one or more input/output ('I/O') adapters 578. I/O adapters implement user-oriented input/output through, for example, software drivers and computer hardware for controlling output to display devices such as computer display screens, as well as user input from user input devices 581 such as keyboards and mice. The example computer 552 includes a video adapter 509, which is an example of an I/O adapter specially designed for graphic output to a display device 580 such as a display screen or computer monitor. Video adapter 509 is connected to processor 556 through a high speed video bus 564, bus adapter 558, and the front side bus 562, which is also a high speed bus.

The example computer 552 includes a communications adapter 567 for data communications with other computers 510, e.g., mobile devices, and for data communications with a data communications network 500. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, an engine, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, by a processor, a first social customer relationship management (CRM) opportunity and a request to generate a template index file based on the first social CRM opportunity from a first social CRM application;
extracting, by the processor, one or more structural elements from the first social CRM opportunity, the one or more structural elements describing components of the first social CRM opportunity, wherein the one or more structural elements is written in one or more Extensive Markup Language (XML) definition files;
extracting, by the processor, one or more structural attributes of each of the one or more structural elements responsive to extracting the one or more structural elements, the one or more structural attributes describing the components of each of the one or more structural elements, wherein the one or more structural attributes is written in one or more XML definition files;
storing, by the processor, the one or more structural elements and the one or more structural attributes associated with each of the one or more structural elements in a template database;
mapping, by the processor, the one or more structural attributes to the one or more structural elements;
mapping, by the processor, the one or more structural elements to the first social CRM opportunity;
generating, by the processor, a template index file from the mapped one or more structural attributes and the mapped one or more structural elements;
storing, by the processor, data associated with the first social CRM opportunity in the template database, wherein the data associated with the first social CRM opportunity includes the mapped one or more structural attributes, the mapped one or more structural elements, and the template index file, and wherein the template database stores multiple templates associated with multiple social CRM opportunities;
receiving a request to retrieve the template index file, the request received from a second social CRM application;
in response to receiving the request, retrieving the stored one or more structural elements, the stored one or more structural attributes, and the stored template index file from the template database; and
generating a second social CRM opportunity from the stored one or more structural elements, the stored one or more structural attributes, and the stored template index file.

2. The method of claim 1, wherein at least one of the structural elements includes an application used in the first social CRM opportunity.

3. The method of claim 1, further comprising:
extracting security permissions for the one or more structural elements; and
associating the security permissions with the one or more structural elements in the template database.

4. The method of claim 1, further comprising:
retrieving the template index file for the first social CRM opportunity from the template database;
importing the one or more structural attributes for each of the one or more structural elements of a retrieved CRM opportunity; and
establishing a business logic, that determines a workflow on how data is transformed, calculated, and routed, for the retrieved CRM opportunity from the one or more structural attributes.

5. The method of claim 4, further comprising:
establishing a relational logic for the retrieved CRM opportunity from the one or more structural attributes.

6. The method of claim 4, further comprising:
determining whether the one or more structural elements is accessible; and
sending an alert to the first social CRM application in response to the one or more structural elements being inaccessible.

7. The method of claim 6, further comprising:
receiving a substitute structural element in response to the one or more structural elements being inaccessible.

8. The method of claim 1, wherein extracting the one or more structural attributes includes:
determining whether content selection is enabled;
providing available content to select in response to the content selection being enabled; and
extracting a selected available content to the template.

9. A system, comprising:
a template database;
an extraction engine configured to
receive, by a processor, a first social customer relationship management (CRM) opportunity and a request to generate a template index file based on the first social CRM opportunity from a first social CRM application,
extract, by the processor, one or more structural elements from the first social CRM opportunity, the one or more structural elements describing components of the first social CRM opportunity, wherein the one or more structural elements is written in one or more Extensive Markup Language (XML) definition files,
extract, by the processor, one or more structural attributes of each of the one or more structural elements responsive to extracting the one or more structural elements, the one or more structural attributes describing the components of each of the one or more structural elements, wherein the one or more structural attributes is written in one or more XML definition files;
a mapping engine configured to
store, by the processor, the one or more structural elements and the one or more structural attributes associated with each of the one or more structural elements in a template database,
map, by the processor, the one or more structural attributes to the one or more structural elements,
map, by the processor, the one or more structural elements to the first social CRM opportunity,
generate, by the processor, a template index file from the mapped one or more structural attributes and the mapped one or more structural elements,
store, by the processor, data associated with the first social CRM opportunity in the template database, wherein the data associated with the first social CRM opportunity includes the mapped one or more structural attributes, the mapped one or more structural elements, and the template index file, and wherein the template database stores multiple templates associated with multiple social CRM opportunities; and a template retrieval engine configured to
receive a request to receive the template index file, the request received from a second social CRM application,
in response to receiving the request, retrieve the stored one or more structural elements, the stored one or more structural attributes, and the stored template index file from the template database, and
generate a second social CRM opportunity from the stored one or more structural elements, the stored one or more structural attributes, and the stored template index file.

10. The system of claim 9, wherein the template retrieval engine is configured to:
retrieve the template index file for the first social CRM opportunity from the template database;
import the one or more structural attributes for each of the one or more structural elements of a retrieved CRM opportunity; and
establish a business logic, that determines a workflow on how data is transformed, calculated, and routed, for the retrieved CRM opportunity from the one or more structural attributes.

11. The system of claim 10, wherein the template retrieval engine is further configured to:
determine whether the one or more structural elements is accessible; and
send an alert to the first social CRM application in response to the one or more structural elements being inaccessible.

12. The system of claim 11, wherein the template retrieval engine is further configured to:
receive a substitute structural element in response to the one or more structural elements being inaccessible.

13. A computer program product comprising a non-transitory computer readable storage device having a computer readable program stored therein, wherein the computer readable program, when executed on a computing device, causes the computing device to:
receive, by a processor, a first social customer relationship management (CRM) opportunity and a request to generate a template index file based on the first social CRM opportunity from a first social CRM application;
extract, by the processor, one or more structural elements from the first social CRM opportunity, the one or more structural elements describing components of the first social CRM opportunity, wherein the one or more structural elements is written in one or more Extensive Markup Language (XML) definition files;
extract, by the processor, one or more structural attributes of each of the one or more structural elements responsive to extracting the one or more structural elements, the one or more structural attributes describing the components of each of the one or more structural elements, wherein the one or more structural attributes is written in one or more XML definition files;
store, by the processor, the one or more structural elements and the one or more structural attributes associated with each of the one or more structural elements in a template database;
map, by the processor, the one or more structural attributes to the one or more structural elements;
map, by the processor, the one or more structural elements to the first social CRM opportunity;
generate, by the processor, a template index file from the mapped one or more structural attributes and the mapped one or more structural elements;
store, by the processor, data associated with the first social CRM opportunity in the template database, wherein the data associated with the first social CRM opportunity includes the mapped one or more structural attributes, the mapped one or more structural elements, and the template index file, and wherein the template database stores multiple templates associated with multiple social CRM opportunities;
receive a request to retrieve the template index file, the request received from a second social CRM application;
in response to receiving the request, retrieve the stored one or more structural elements, the stored one or more structural attributes, and the stored template index file from the template database; and
generate a second social CRM opportunity from the stored one or more structural elements, the stored one or more structural attributes, and the stored template index file.

14. The computer program product of claim 13, wherein the computer readable program further causes the computing device to:
retrieve the template index file for the first social CRM opportunity from the template database;
import the one or more structural attributes for each of the one or more structural elements of a retrieved CRM opportunity; and
establish a business logic, that determines a workflow on how data is transformed, calculated, and routed, for the retrieved CRM opportunity from the one or more structural attributes.

15. The computer program product of claim 14, wherein the computer readable program further causes the computing device to:
determine whether the one or more structural elements is accessible; and
send an alert to the first social CRM application in response to the one or more structural elements being inaccessible.

* * * * *